(12) United States Patent
Hammad et al.

(10) Patent No.: US 8,523,069 B2
(45) Date of Patent: Sep. 3, 2013

(54) MOBILE TRANSIT FARE PAYMENT

(75) Inventors: Ayman Hammad, Pleasanton, CA (US); Phil Dixon, San Diego, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 120 days.

(21) Appl. No.: 11/536,296

(22) Filed: Sep. 28, 2006

(65) Prior Publication Data
US 2008/0116264 A1 May 22, 2008

(51) Int. Cl.
*G07B 15/02* (2011.01)
*G06F 17/00* (2006.01)

(52) U.S. Cl.
USPC .......................................... 235/384; 235/375

(58) Field of Classification Search
USPC ...... 235/384, 451, 380, 375, 379; 455/456.3, 455/456, 457, 451; 340/539.18, 994; 370/312, 370/313; 705/14, 26, 27, 7.18
See application file for complete search history.

(56) References Cited

U.S. PATENT DOCUMENTS

| | | | |
|---|---|---|---|
| 2,328,654 A | 9/1943 | Lake et al. | |
| 3,008,635 A | 11/1961 | Sakalay | |
| 4,303,904 A | 12/1981 | Chasek | |
| 4,672,182 A * | 6/1987 | Hirokawa | 235/436 |
| 4,736,094 A | 4/1988 | Yoshida | |
| 4,822,985 A | 4/1989 | Boggan et al. | |
| 4,851,650 A | 7/1989 | Kitade | |
| 4,857,893 A | 8/1989 | Carroll | |
| 4,870,259 A | 9/1989 | Boggan et al. | |
| 4,899,036 A | 2/1990 | McCrindle et al. | |
| 4,908,521 A | 3/1990 | Boggan et al. | |
| 4,928,001 A | 5/1990 | Masada | |
| 4,943,707 A | 7/1990 | Boggan | |
| 5,103,079 A | 4/1992 | Barakai et al. | |
| 5,191,193 A | 3/1993 | Le Roux | |
| 5,286,955 A | 2/1994 | Klosa | |

(Continued)

FOREIGN PATENT DOCUMENTS

| | | |
|---|---|---|
| CN | 1436431 A | 8/2008 |
| EP | 0 254 595 B1 | 1/1988 |

(Continued)

OTHER PUBLICATIONS

"The NYC Subway Trial | MasterCard® | About the Trial", downloaded from the Internet at http://www.mastercard.com/us/paypass/subway/about/subwaytrial_newsrelease_30Jan2006html on Jun. 11, 2008, pp. 1-2.

(Continued)

*Primary Examiner* — Thien T Mai
(74) *Attorney, Agent, or Firm* — Kilpatrick Townsend Stockton LLP (57) ABSTRACT

A system, apparatus, and method for facilitating the payment and collection of transit system fares using a mobile device. The inventive system utilizes a contactless element embedded within a mobile wireless device, such as a mobile phone, PDA, or the like. The smart element is integrated with the circuitry of the mobile device to permit the data to be accessed and manipulated (e.g., read, written, erased) using the wireless communications network as the data transport channel. The data required to enable a user to access a transit system and for the system to conduct fare calculations may be provided to the memory in the contactless element using the wireless network. Such data may include access control data (keys, passwords, identification data) or data required for fare calculations (rates, historical data on system use).

22 Claims, 3 Drawing Sheets

(56) References Cited

U.S. PATENT DOCUMENTS

| | | |
|---|---|---|
| 5,337,063 A | 8/1994 | Takahira |
| 5,360,967 A | 11/1994 | Perkin et al. |
| 5,396,558 A | 3/1995 | Ishiguro et al. |
| 5,477,038 A | 12/1995 | Levine et al. |
| 5,485,520 A | 1/1996 | Chaum et al. |
| 5,500,513 A | 3/1996 | Langhans et al. |
| 5,503,774 A | 4/1996 | Brons et al. |
| 5,550,734 A | 8/1996 | Tarter et al. |
| 5,562,550 A | 10/1996 | Chartrand |
| 5,585,614 A | 12/1996 | VonBallmoos |
| 5,585,787 A | 12/1996 | Wallerstein |
| 5,649,118 A | 7/1997 | Carlisle et al. |
| 5,801,943 A | 9/1998 | Nasburg |
| 5,828,044 A | 10/1998 | Jun et al. |
| 5,844,230 A | 12/1998 | Lalonde |
| 5,864,830 A | 1/1999 | Armetta et al. |
| 5,883,377 A | 3/1999 | Chapin, Jr. |
| 5,903,830 A | 5/1999 | Joao et al. |
| 5,917,965 A | 6/1999 | Cahill et al. |
| 5,929,428 A | 7/1999 | Iijima |
| 5,946,669 A | 8/1999 | Polk |
| 5,953,710 A | 9/1999 | Fleming |
| 5,984,180 A | 11/1999 | Albrecht |
| 5,984,191 A | 11/1999 | Chapin, Jr. |
| 5,991,527 A | 11/1999 | Plint et al. |
| 5,991,749 A | 11/1999 | Morrill, Jr. |
| 6,021,943 A | 2/2000 | Chastain |
| 6,038,597 A * | 3/2000 | Van Wyngarden ............ 709/219 |
| 6,039,245 A | 3/2000 | Symonds et al. |
| 6,044,360 A | 3/2000 | Picciallo |
| 6,097,292 A | 8/2000 | Kelly et al. |
| 6,101,477 A * | 8/2000 | Hohle et al. .................. 235/380 |
| 6,105,009 A | 8/2000 | Cuervo |
| 6,119,107 A | 9/2000 | Polk |
| 6,138,917 A | 10/2000 | Chapin, Jr. |
| 6,176,425 B1 | 1/2001 | Harrison et al. |
| 6,179,205 B1 | 1/2001 | Sloan |
| 6,185,307 B1 | 2/2001 | Johnson, Jr. |
| 6,199,762 B1 * | 3/2001 | Hohle ............................ 235/492 |
| 6,216,227 B1 | 4/2001 | Goldstein et al. |
| 6,402,029 B1 | 6/2002 | Gangi |
| 6,422,462 B1 | 7/2002 | Cohen |
| 6,453,335 B1 | 9/2002 | Kaufmann |
| 6,473,500 B1 | 10/2002 | Risafi et al. |
| 6,502,745 B1 | 1/2003 | Stimson et al. |
| 6,529,725 B1 | 3/2003 | Joao et al. |
| 6,549,912 B1 | 4/2003 | Chen |
| 6,577,229 B1 | 6/2003 | Bonneau et al. |
| 6,587,835 B1 * | 7/2003 | Treyz et al. ................. 705/14.64 |
| 6,609,655 B1 | 8/2003 | Harrell |
| 6,615,189 B1 | 9/2003 | Phillips et al. |
| 6,615,190 B1 | 9/2003 | Slater |
| 6,629,591 B1 | 10/2003 | Griswold et al. |
| 6,655,587 B2 | 12/2003 | Andrews et al. |
| 6,685,088 B1 | 2/2004 | Royer et al. |
| 6,726,098 B2 | 4/2004 | Schilling |
| 6,729,549 B2 | 5/2004 | Hamann et al. |
| 6,732,080 B1 * | 5/2004 | Blants ........................... 705/7.18 |
| 6,859,650 B1 | 2/2005 | Ritter |
| 6,892,187 B2 | 5/2005 | Phillips et al. |
| 6,915,277 B1 | 7/2005 | Manchester et al. |
| 6,934,689 B1 | 8/2005 | Ritter et al. |
| 6,938,821 B2 | 9/2005 | Gangi |
| 6,970,891 B1 | 11/2005 | Deo et al. |
| 7,054,838 B2 | 5/2006 | Sutton et al. |
| 7,083,087 B1 | 8/2006 | Gangi |
| 7,092,697 B1 | 8/2006 | Kupsh et al. |
| 7,096,003 B2 | 8/2006 | Joao et al. |
| 7,114,179 B1 | 9/2006 | Ritter et al. |
| 7,130,828 B2 | 10/2006 | Phillips et al. |
| 7,163,145 B2 | 1/2007 | Cohagan et al. |
| 7,165,049 B2 | 1/2007 | Slater |
| 7,171,388 B2 | 1/2007 | Phillips et al. |
| 7,172,112 B2 | 2/2007 | Bonalle et al. |
| 7,174,314 B2 | 2/2007 | Phillips et al. |
| 7,174,315 B2 | 2/2007 | Phillips et al. |
| 7,174,316 B2 | 2/2007 | Phillips et al. |
| 7,174,317 B2 | 2/2007 | Phillips et al. |
| 7,209,757 B2 * | 4/2007 | Naghian et al. ............ 455/456.3 |
| 7,225,155 B1 | 5/2007 | Polk |
| 7,268,667 B2 | 9/2007 | Beenau et al. |
| 7,268,668 B2 | 9/2007 | Beenau et al. |
| 7,317,823 B1 | 1/2008 | Price et al. |
| 7,360,699 B2 | 4/2008 | Cohagan et al. |
| 7,363,273 B2 | 4/2008 | Phillips et al. |
| 7,433,452 B2 | 10/2008 | Taylor et al. |
| 7,437,362 B1 | 10/2008 | Ben-Natan |
| 7,447,662 B2 | 11/2008 | Gibson |
| 7,469,827 B2 | 12/2008 | Katragadda et al. |
| 7,506,804 B2 | 3/2009 | Zajkowski et al. |
| 7,527,208 B2 | 5/2009 | Hammad et al. |
| 7,529,563 B1 | 5/2009 | Pitroda |
| 7,594,611 B1 | 9/2009 | Arrington, III |
| 7,959,074 B1 | 6/2011 | Chopra et al. |
| 8,118,223 B2 | 2/2012 | Hammad et al. |
| 2001/0026679 A1 | 10/2001 | Koshino et al. |
| 2001/0033447 A1 | 10/2001 | Miles |
| 2001/0051920 A1 | 12/2001 | Joao et al. |
| 2001/0056536 A1 | 12/2001 | Everett et al. |
| 2002/0002534 A1 | 1/2002 | Davis et al. |
| 2002/0010603 A1 * | 1/2002 | Doi et al. ........................... 705/5 |
| 2002/0038336 A1 | 3/2002 | Abileah et al. |
| 2002/0050528 A1 | 5/2002 | Everett et al. |
| 2002/0077122 A1 * | 6/2002 | Yule ............................. 455/456 |
| 2002/0103865 A1 | 8/2002 | Lilly |
| 2002/0111919 A1 | 8/2002 | Weller et al. |
| 2002/0118118 A1 | 8/2002 | Myllymaki et al. |
| 2002/0145984 A1 * | 10/2002 | Babu et al. .................... 370/312 |
| 2002/0152123 A1 | 10/2002 | Giordano et al. |
| 2002/0152163 A1 | 10/2002 | Bezos et al. |
| 2002/0156807 A1 | 10/2002 | Dieberger |
| 2002/0163884 A1 | 11/2002 | Peles et al. |
| 2002/0194138 A1 | 12/2002 | Dominguez et al. |
| 2003/0028814 A1 | 2/2003 | Carta et al. |
| 2003/0050087 A1 | 3/2003 | Kwon |
| 2003/0050906 A1 | 3/2003 | Clifton-Bligh |
| 2003/0053609 A1 | 3/2003 | Risafi et al. |
| 2003/0061111 A1 | 3/2003 | Dutta et al. |
| 2003/0083944 A1 | 5/2003 | Duvall et al. |
| 2003/0105711 A1 | 6/2003 | O'Neil |
| 2003/0135487 A1 | 7/2003 | Beyer et al. |
| 2003/0137435 A1 * | 7/2003 | Haddad et al. ................ 340/994 |
| 2003/0144894 A1 | 7/2003 | Robertson et al. |
| 2003/0153330 A1 * | 8/2003 | Naghian et al. ............... 455/456 |
| 2003/0174839 A1 | 9/2003 | Yamagata et al. |
| 2003/0181845 A1 | 9/2003 | Orton |
| 2003/0216927 A1 | 11/2003 | Sridhar et al. |
| 2003/0221105 A1 | 11/2003 | Bizet |
| 2004/0000585 A1 | 1/2004 | Silverbrook et al. |
| 2004/0006536 A1 | 1/2004 | Kawashima et al. |
| 2004/0016801 A1 | 1/2004 | Newsome et al. |
| 2004/0039686 A1 | 2/2004 | Klebanoff |
| 2004/0117300 A1 | 6/2004 | Jones et al. |
| 2004/0139021 A1 | 7/2004 | Reed |
| 2004/0155960 A1 | 8/2004 | Wren et al. |
| 2004/0256455 A1 | 12/2004 | Fukushima et al. |
| 2005/0018574 A1 | 1/2005 | Jenkins et al. |
| 2005/0036391 A1 | 2/2005 | Tomiie et al. |
| 2005/0053211 A1 | 3/2005 | Bevente et al. |
| 2005/0086160 A1 | 4/2005 | Wong et al. |
| 2005/0103839 A1 | 5/2005 | Hewel |
| 2005/0127168 A1 | 6/2005 | Phillips et al. |
| 2005/0165695 A1 | 7/2005 | Berardi et al. |
| 2005/0173518 A1 * | 8/2005 | Takayama ..................... 235/380 |
| 2005/0185774 A1 | 8/2005 | Grear et al. |
| 2005/0203842 A1 | 9/2005 | Sanchez et al. |
| 2005/0234778 A1 | 10/2005 | Sperduti et al. |
| 2005/0240743 A1 | 10/2005 | Eng et al. |
| 2005/0269417 A1 | 12/2005 | Wood |
| 2006/0000891 A1 * | 1/2006 | Bonalle et al. ................ 235/380 |
| 2006/0100933 A1 | 5/2006 | Fujita et al. |
| 2006/0106650 A1 | 5/2006 | Bush |
| 2006/0161435 A1 | 7/2006 | Atef et al. |
| 2006/0240862 A1 | 10/2006 | Neven et al. |

| | | | |
|---|---|---|---|
| 2006/0258337 | A1 | 11/2006 | Fujita et al. |
| 2006/0278704 | A1 | 12/2006 | Saunders et al. |
| 2006/0282528 | A1 | 12/2006 | Madams et al. |
| 2006/0287964 | A1 | 12/2006 | Brown |
| 2007/0023504 | A1 | 2/2007 | Blankenship et al. |
| 2007/0045403 | A1 | 3/2007 | Slonecker |
| 2007/0051797 | A1 | 3/2007 | Randolph-Wall et al. |
| 2007/0075140 | A1 | 4/2007 | Guez et al. |
| 2007/0076872 | A1 | 4/2007 | Juneau |
| 2007/0087818 | A1 | 4/2007 | Walker et al. |
| 2007/0100664 | A1 | 5/2007 | Seib et al. |
| 2007/0100691 | A1 | 5/2007 | Patterson |
| 2007/0100754 | A1 | 5/2007 | Brown |
| 2007/0103277 | A1 | 5/2007 | Yuk et al. |
| 2007/0145135 | A1* | 6/2007 | Jogand-Coulomb et al. .. 235/451 |
| 2007/0168674 | A1 | 7/2007 | Nonaka et al. |
| 2008/0033880 | A1 | 2/2008 | Fiebiger et al. |
| 2008/0054072 | A1 | 3/2008 | Katragadda et al. |
| 2008/0120214 | A1 | 5/2008 | Steele et al. |
| 2008/0128513 | A1 | 6/2008 | Hammad et al. |
| 2008/0156873 | A1 | 7/2008 | Wilhelm et al. |
| 2008/0162295 | A1 | 7/2008 | Bedier |
| 2008/0172341 | A1 | 7/2008 | Crandell |
| 2008/0201212 | A1 | 8/2008 | Hammad et al. |
| 2008/0203151 | A1 | 8/2008 | Hammad et al. |
| 2008/0203152 | A1 | 8/2008 | Hammad et al. |
| 2008/0203170 | A1 | 8/2008 | Hammad et al. |
| 2008/0208681 | A1 | 8/2008 | Hammad et al. |
| 2008/0230600 | A1 | 9/2008 | Black et al. |
| 2009/0171682 | A1 | 7/2009 | Dixon et al. |
| 2009/0184163 | A1 | 7/2009 | Hammad et al. |
| 2009/0239512 | A1 | 9/2009 | Hammad et al. |

FOREIGN PATENT DOCUMENTS

| | | |
|---|---|---|
| EP | 0 795 165 B1 | 9/2000 |
| GB | 2 267 626 | 12/1993 |
| KR | 100287012 B1 | 1/2001 |
| WO | WO 01/91485 | 11/2001 |
| WO | WO 0191485 A1 * | 11/2001 |
| WO | 02/093307 A2 | 11/2002 |
| WO | 02/093307 A3 | 11/2002 |
| WO | 2005/121975 A1 | 12/2005 |
| WO | WO2006/124808 A1 | 11/2006 |
| WO | WO 2007/139302 A1 | 12/2007 |

OTHER PUBLICATIONS

"Metrorail, Washington, D.C.," downloaded from the internet at http://www.en.wikipedia.org, on Jul. 30, 2008, pp. 1-3.
Notice from the European Patent Office dated Oct. 1, 2007 concerning business methods, Official Journal EPO, Nov. 2007, p. 592-593.
Supplementary European Search Report dated Jan. 5, 2011 for European Application No. 08743584, 5 pages.
"SmartTrip," version edited by Schumin Web on Sep. 4, 2005, downloaded from the internet at http://www.wikipedia.org, on Feb. 24, 2011, 4 pages.
American Public Transportation Association; "Account Linked Payment Service Concept White Paper", downloaded from the internet at http://www.speacq.com/industry/APTA_FSP_ALPS_White_Paper.pdf ; (last modified Jan. 25, 2007), 33 pages.
AMTEL; "Understanding the Requirements of ISO/IEC 14443 for Type B Proximity Contactless Identification Cards"; Nov. 2005; 28 pages.
Australian Office Action mailed on Oct. 4, 2011, for AU Patent Application No. 2008221392, 2 pages.
Australian Notice of Acceptance mailed on Jan. 15, 2012, for AU Patent Application No. 2008221392, 1 page.
Chinese Office Action, with English Translation, mailed on Jun. 2, 2010, for CN Patent Application No. 200780043545.9, 9 pages.
Chinese Office Action, with English Translation, mailed on Nov. 30, 2011, for CN Patent Application No. 200780043545.9, 10 pages.
Definition of "Smart Card"; 2000; Collin's Dictionary of Computing; downloaded from the internet on Sep. 15, 2011; 1 page.
Definition of "Smart Card"; 2001; Hargrave's Communications Dictionary; downloaded from the internet on Sep. 15, 2011; 1 page.
Definition of "Smart Card"; 2003; Webster's New World Computer Dictionary; downloaded from the internet on Sep. 15, 2011; 1 page.
Definition of "Smart Card"; Date Unknown; Netlingo.com; downloaded from the internet on Sep. 15, 2011; 1 page.
Definition of "Smart Card"; Dictionary of Computing; 2008; downloaded from the internet on Sep. 15, 2011; 1 page.
Extended European Search Report mailed on Apr. 25, 2012, for EP Patent Application No. 07854911.0, 8 pages.
International Preliminary Report on Patentability mailed Jun. 18, 2009 in Application No. PCT/US2007/086342, 7 pages.
International Search Report mailed on Jul. 21, 2008, for PCT Patent Application No. PCT/US2007/086342, 1 page.
International Search Report mailed on Jul. 31, 2008, for PCT Patent Application No. PCT/US2008/055195, 1 page.
International Search Report mailed on Aug. 1, 2008, for PCT/US2008/055196, 1 page.
International Search Report mailed on Aug. 4, 2008, for PCT Patent Application No. PCT/US2008/055192, 1 page.
International Search Report mailed on Aug. 15, 2008, for PCT Patent Application No. PCT/US2007/079453, 1 page.
International Search Report mailed on Jan. 9, 2009, for PCT/US2008/083181, 1 page.
Schellhorn, Gerhard; "Verification of a Formal Security Model for Multiplicative Smart Cards"; Proceedings of the European Symposium on Research in Computersecurity; Oct. 4, 2000; pp. 17-36.
International Search Report mailed Nov. 11, 2010 in EP Application No. 07843170.7, filed Sep. 28, 2006.
Office Action mailed Mar. 1, 2012 in Chinese Patent Application No. 200780043545.9, 5 pages.
International Written Opinion mailed Jul. 6, 2010 in SG Application No. 200902024-9 filed Sep. 28, 2006.

* cited by examiner

MOBILE TRANSIT FARE PAYMENT

BACKGROUND OF THE INVENTION

The present invention is directed to systems, apparatuses and methods for the payment and collection of transit fares, and more specifically, to a system and associated apparatus and method that utilizes a mobile device such as a cell phone to enable payment of a transit fare. The present invention is further directed to systems, methods and apparatuses for using a contactless element such as an integrated circuit chip embedded in a wireless mobile device that may combine transaction payment and transit fare payment capabilities.

Many people regularly commute to work or travel for other purposes using transportation systems. Such systems include public transportation systems, for example, buses, subways, trains, ferries, and the like. Typically, these transportations systems require some form of fare payment at one or more sites of the system. One means of fare payment is the use of some form of payment card, from which a fare can be deducted against a previously established balance, or to which a fare can be applied as a credit type debt to be paid at a later date. However, such payment cards generally require that the user pass the card through a card reader or other mechanism, or hand the card to a transit operator. This requirement is inefficient and sub-optimal as transit users are often in a hurry, and do not wish to wait in lines or engage in a formal transaction process that may require more time than desired for authentication of the user and approval of the transaction.

The problems encountered in standard payment card systems has led to an interest in the use of contactless "smart" cards or contactless smart chips as part of a fare payment system. A smart card is generally defined as a pocket-sized card (or other portable payment device) that is embedded with either a microprocessor and one or more memory chips, or one or more memory chips with non-programmable logic. The microprocessor type card typically can implement certain data processing functions, such as to add, delete, or otherwise manipulate information stored in a memory location on the card. In contrast, the memory chip type card (for example, a pre-paid phone card) can only act as a file to hold data that is manipulated by the reading device to perform a pre-defined operation, such as debiting a charge from a pre-established balance held in the memory or secure memory. Smart cards, unlike magnetic stripe cards (such as standard credit cards), can implement a variety of functions and contain a variety of types of information on the card. Therefore, in some applications they do not require access to remote databases for the purpose of user authentication or record keeping at the time of a transaction. A smart chip is a semiconductor device that is capable of performing most, if not all, of the functions of a smart card, but may be embedded in another device.

Smart cards come in two general varieties; the contact type and the contactless type. A contact type smart card is one that includes contacts which enable access to the data and functional capabilities of the card, typically via some form of terminal or card reader. A contactless smart card is a smart card that incorporates a means of communicating with the card reader or terminal without the need for direct contact. Thus, such cards may effectively be "swiped" by passing them close to the card reader or terminal. Such contactless cards typically communicate with the card reader or terminal using RF (radio-frequency) technology, wherein proximity to an antenna causes data transfer between the card and the reader or terminal. Contactless cards have found uses in banking and transit applications, as they may not require removal from one's wallet or pocket in order to complete a transaction. Further, because of the growing interest in such cards, standards have been developed that govern the operation and interfaces for contactless smart cards, such as the ISO 14433 standard.

Even though contactless smart cards provide a solution to some of the problems encountered by standard payment cards in a transit fare payment and collection environment, they do not provide a complete solution. In transit applications, the speed of the transaction for the user is a primary consideration. This means that the transit fare payment and collection process can not be performed effectively using a standard on-line authentication and approval process, as may be used for a purchase transaction at a retail point of sale through the financial payment network. This presents a difficulty because effective fraud prevention typically requires authentication that the card user is entitled to access the transit system and has sufficient funds for the desired transaction. In addition, different transit systems will typically have different authentication requirements, fare calculations, and ancillary data requirements. This means that the smart card must contain the data relevant for the transit system a user wishes to utilize when the user attempts to access the system. This can become a significant problem if a user wishes to utilize more than one transit system, such as two transit agencies within a single geographical area or transit systems in two different cities or locations.

Further, as transit typically involves moving between stations, with different fare calculations and rates required depending upon the actual travel distance, direction, patron category, and/or times of use, fares may need to be computed based on station entry and exit location, direction, mode of travel, category of patron, and possibly time of day. This would require that the smart card terminals/readers at each station or route be able to perform these computations based on data stored and retrieved from a user's card, and subsequent card terminals/readers be able to access data written to the card at previous stations.

Thus, the transit environment presents several issues that make use of a standard contactless smart card or chip problematic. In addition to those noted, these issues include:

- A need for one card per transit agency or group of cooperating agencies;
- If a contactless payment card is used, it typically lacks the ability to write back to the chip, and data is not available on subsequent transactions to calculate the fare. This adds to the burden of the system having to keep track of card history and calculate the fare in a post processing system rather than at the gate or farebox;
- It may be required that a patron, who is visiting a location or agency for the first time may need to register their card for use in that system. This may take a physical process of going and doing something before the card may be used in transit at the new location; and
- Each agency or region may utilize a different set of file structures and/or information to handle their fare policy, and a single card may lack the appropriate data formats or encryption capability.

What is desired is a system, apparatus and method for payment and collection of transit fares that utilizes a contactless smart chip and which overcomes the noted disadvantages of current approaches.

BRIEF SUMMARY OF THE INVENTION

The present invention is directed to a system, apparatus, and method for facilitating the payment and collection of transaction fees or fares using a contactless element such as a contactless smart chip. The inventive system can utilize a contactless element including, for example, a contactless smart chip and a wireless data transfer element (e.g., an antenna, LED, laser diode, etc.), embedded within a mobile wireless device, such as a mobile phone, PDA, MP3 player or the like. The smart chip, or other type of device, can be integrated with the circuitry of the mobile device to permit data stored on the chip to be accessed and manipulated (e.g., read, written, erased) using the wireless communications network as the data transport channel. In this way, the data required to enable a user to access, for example, a transit system and data for the system to conduct fare calculations may be provided to the chip using the wireless network. Such data may include access control data (keys, passwords, identification data) or data required for fare calculations (rates, historical data on system use), for example.

The contactless element associated with the mobile device may combine financial payment functions and transit specific functions within one or more secure chips or other data storage medium. This enables the mobile device to function as both an electronic wallet for commerce transactions and as a transit system token, for access to and fare payment of transit services. In one embodiment, implementation of both functions is achieved by use of a dynamic memory management system that permits data for the financial payment, transit and other applications to be stored on the chip, with the transit data and storage locations being configurable using the wireless network.

Further, because the mobile device, alone or in conjunction with the network, may incorporate location determining technologies, data relevant to a particular transit system may be provided as a user moves between different locations, regions, or cities. In addition, operations required to configure the chip, either in terms of data storage (partitions, indexing, data management) or functional capabilities, may be accomplished via the network as a form of over-the-air provisioning. This eliminates the need for a user to visit a transit office or kiosk to activate the smart card's functionality, obtain the access control data or obtain other information needed prior to using a specific transit system.

In one embodiment, the present invention is directed to a method of providing access to a system for a user of a mobile device. The method includes generating system access control data for the user of the mobile device, where the mobile device is capable of communication and data exchange over a wireless network, and communication and data exchange using a near field communications technology. The method further includes providing the transit system access control data to an element of the wireless network, whereby the access control data is caused to be transmitted over the wireless network to the mobile device, receiving the access control data at a system collection terminal where the access control data is transferred from the mobile device to the collection terminal using a near field communications technology, and processing the received access control data to determine if the user is provided access to the system.

In another embodiment, the present invention is directed to a system for providing access for a user of a mobile device. The mobile device is capable of communication and data exchange over a wireless network, and communication and data exchange using a near field communications technology. The invention includes a system element in communication with a collection terminal and with an element of the wireless communications network. The invention further includes a processor configured to execute a process to generate access control data, whereby the access control data is provided to the element of the wireless communications network and transferred over the wireless network to the mobile device, and a communication module coupled to the collection terminal, where the communication module is configured to receive the access control data from the mobile device using the near field communications technology.

In yet another embodiment, the present invention is directed to a method of providing access to a transit system for a user of a mobile device. The method includes providing a wireless network element with access control data required for access to the transit system, communicating the access control data to the mobile device over the wireless network, transferring the access control data to a data storage element contained within the mobile wireless device, communicating the access control data to the transit system using a near field communications technology, and processing the communicated access control data to determine if the user is provided access to the transit system.

Other objects and advantages of the present invention will be apparent to one of ordinary skill in the art upon review of the detailed description of the present invention and the included figures.

DETAILED DESCRIPTION OF THE INVENTION

The present invention is directed to a system, apparatus, and method for efficiently enabling the use of a contactless element in an environment such as a transit fare payment and collection environment. Embodiments of the invention can be used to both access a system such as a transit system and to pay for goods or services at merchant locations. In the description below, a "transit system" is described in detail. However, it is understood that other types of systems can be used in embodiments of the invention. For example, a wireless phone according to an embodiment of the invention may be used as an access token to access an amusement park, theater, concert hall, school, or other venue, while also being used as a payment token to provide payment for ordinary commercial transactions or money transfers.

Embodiments of the invention use a contactless element (which may include a contactless chip and wireless data transfer element, such as an antenna) embedded within a wireless mobile device to enable a user to access multiple transit systems without the need to physically visit a transit office or kiosk to obtain access control and/or fare calculation data. Instead, such data, and any other data relevant to using the transit system is provided via the wireless communications network. Further, because the wireless mobile device may have other data access capabilities (such as Internet browsing or short-message-service (SMS)), information regarding transit routes, schedules or promotions may also be made available to a user.

The contactless element embedded within the mobile device may combine the capabilities for retail point of sale payment and transit system access and use. This permits the mobile device to function as a financial payment mechanism or token (such as a credit/debit card) and as a transit system (or other venue) access token. In such an embodiment, the chip that forms at least part of the contactless element may utilize a dynamic memory storage element. In such a storage element, the memory in the chip may be partitioned to include a section for storage of payment related functions, and a section partitioned for transit applications. The transit application may be resident on the mobile device or sent to the mobile device over the wireless network. The transit application may have preloaded data for one of or more transit agencies and have the ability to accept data for other agencies delivered via the wireless network. The transit application section may be configurable using the wireless network to permit provisioning of access control data, fare calculation data, or other relevant data used in one or more transit systems. In this way, the data storage section of the chip, though limited, may be used in multiple transit system environments through updating or overwriting the data as required for the particular transit agency, region, city, or geographical area.

The contactless element can communicate with a transit system fare collection mechanism using a short range communication method, such as a near field communications (NFC) capability. Examples of such NFC technologies include ISO standard 14443, RFID, Bluetooth™ and Infrared communications methods. Thus, the mobile device may be provisioned with transit system data over-the-air in accordance with the requirements of the transit system of interest, with the transit system specific data being stored in a dedicated storage region of the chip. Further, the transit application data storage region may be of a dynamic nature, permitting transit system data to be written and erased as needed to make the most efficient use of the storage medium. Although volatile data storage chips (EEPROMs) are used in one embodiment of the invention, other data storage media may be used in other embodiments of the invention.

Both transit and payment applications have adopted the ISO 14443 standard for contactless smart cards. Because of the use of a common standard, there has developed a desire to utilize a bank-issued contactless payment card as both a commerce payment mechanism at a point of sale and as a transit fare payment mechanism. This would provide for two distinct uses of a single contactless smart card (i.e. transit fare collection and retail point of sale). The present invention is directed to, among other things, overcoming certain disadvantages of using a standard contactless payment card and system in a transit environment.

A first approach to satisfying the desire to combine both functions into a single contactless smart card may be to utilize a contactless payment card in its present form as issued within the transit environment. As presently implemented, a contactless payment application as used in commerce is an on-line transaction requiring end-to-end authentication and issuer (e.g., bank) approval/decline of the transaction. However, because of transaction speed considerations, transit fare payment and collection requires an off-line transaction at the transit system gate or farebox (of the form described for a smart card terminal/reader). This is because, from the user's point of view, there is insufficient time in the transit environment to wait for on-line issuer approval/disapproval of the fare transaction. Ideally, card validation should be processed at the smart card terminal/reader contained in the transit gate or farebox.

In addition to the transaction speed issue, there are security and other risks associated with the use of a contactless payment application card designed for on-line authorization in an off-line transaction. These sources of risk include, but are not limited to:

Authentication: the lack of card/terminal authentication creates a high potential for fraud through counterfeiting techniques;

Fraud: transit transactions are not authorized on-line in real time as designed. With such off-line transactions, the negative list (i.e., a list of rejected cards based on the unique card number) is the primary mechanism to deter fraud. This is sub-optimal since the negative list would presumably grow unbounded as more contactless payment cards are issued and/or wherein the use of counterfeit cards changes the unique card number on each use;

Fare Cost Calculation: the transit fare cannot be calculated at the gate or farebox without historical use information for the card. The cost of a transit transaction is dependent upon previous transaction history for the card. This historical data is not available, and cannot be written or resident on the contactless payment card as defined by financial institution standards;

Data Security/Storage: protection of cardholder data in transit fare collection systems may prove difficult. Tracking data in the form of the PAN (primary account number for the financial institution payment card) is the only security data currently available on a contactless payment card. As a result, transit fare collection systems would have to collect and store this data securely, which is not something transit fare collection systems do presently. If implemented, this requirement presents added cost and security concerns; and Certification: arranging for issuer (e.g., the banking organization) approval of the card reader mechanism in a transit environment may prove difficult to implement. Currently, contactless payment readers must be approved by financial payment organizations. This is not something transit system providers are required to do at present, and if implemented, adds an additional layer of cost and administrative overhead.

To overcome some of the above-mentioned problems which arise from the off-line use of a contactless banking card as defined by financial institution standards to date, use of additional capability of the contactless smart card or chip with data storage capability may be possible. However, using a defined file structure and encryption keys that are specific to one agency or group of cooperating agencies in a transit fare payment and collection environment raises other issues specific to that environment. Specifically, a transit patron is likely to utilize a multitude of transit systems based in different locations, so that a single transit agency may not be responsible for coordinating access and fare calculation data for all of the systems. This means that the contactless smart card may require provisioning with multiple sets of access control and fare calculation data. As the storage space on the card is limited and because transit agencies and systems change over time (as well as the data they require for access and fare calculations), the transit data stored on the card may need to be updated or changed on a regular basis, including deleting stale data or data not relevant to the transit system(s) currently being used. In the case of a standard payment type card, this typically requires that a user visit a representative of the transit agency or card issuer and have the current data programmed into the card for use at that agency or regional location. Such a requirement can rapidly become undesirable as transit patrons seek access to multiple and disparate transit systems around the country, and as new agencies introduce fare processing systems over time.

In this regard, note that at present a transit system user, once they receive their dual payment-transit access card and activate it for payment, would be required to physically go to a designated transit system location in order to store transit-specific data for use in that system. As noted, the transit-specific data may include encryption keys, transit fare products, and other data specific to that particular agency or system. The need to physically go to a transit system location to perform this act would be required at initial issuance of the card as well as any card re-issuance. For transit systems with a significant number of riders (e.g., millions of patrons), the need for such an in-person process may rapidly become undesirable for both the patrons and the transit agency.

Figure 1:
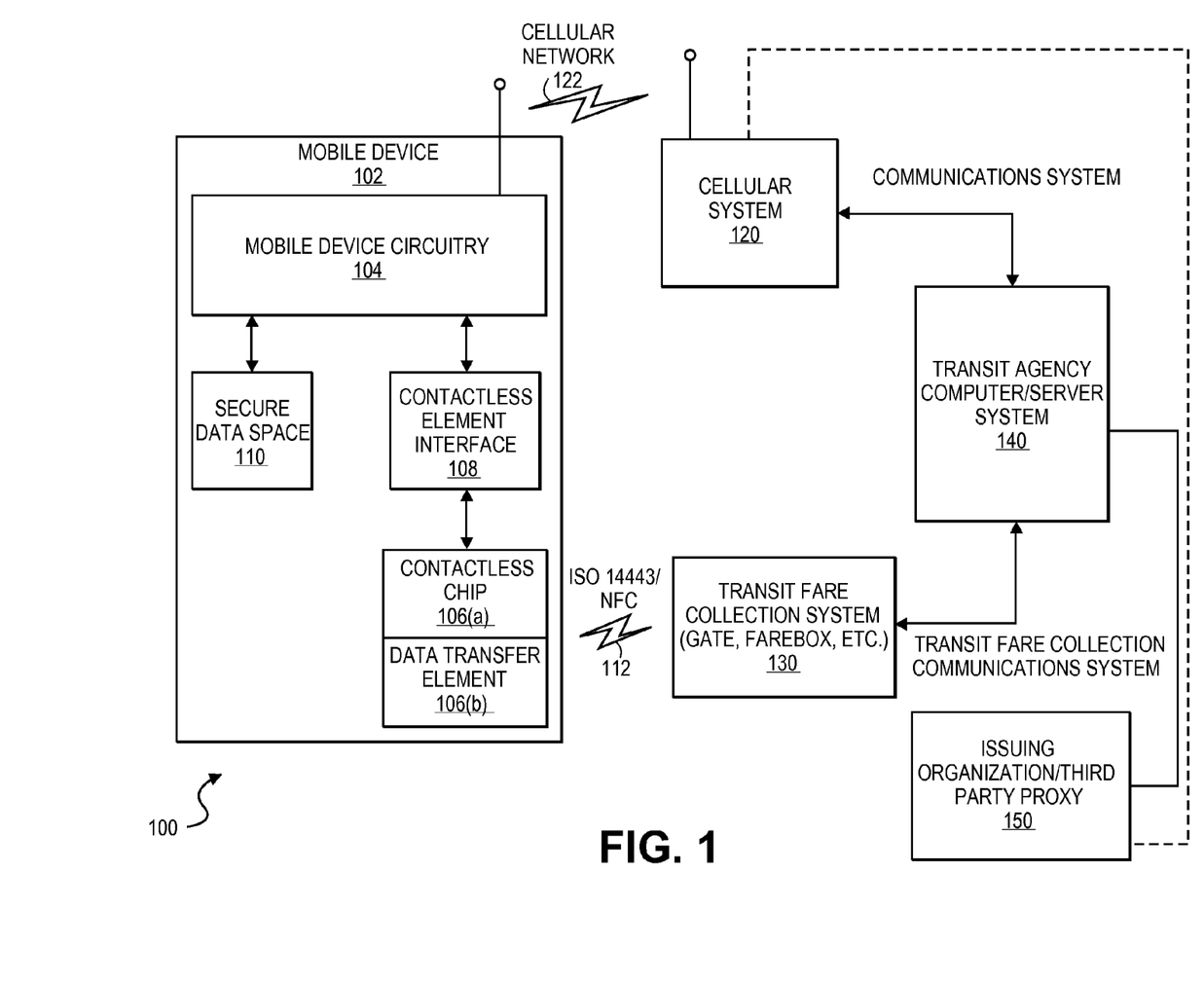
FIG. 1 is a functional block diagram of a first embodiment of a system for enabling a contactless element contained within a mobile device to be used in the fare payment and collection environment, in accordance with an embodiment of the present invention.

FIG. 1 is a functional block diagram of a first embodiment of a system 100 for enabling a contactless element contained within a mobile device to be used in the fare payment and collection environment, in accordance with an embodiment of the present invention. As shown in FIG. 1, system 100 includes a mobile device 102 having wireless communications capabilities 122. Mobile device 102 may be a wireless mobile telephone, PDA, laptop computer, pager, etc. In a typical embodiment, mobile device 102 is a cell phone, although as noted, implementation of the present invention is not limited to this embodiment. In the case of a cell phone as the mobile device 102, the device includes mobile device (cell phone) circuitry 104 that enables certain of the telephony functions. Mobile device circuitry 104 is capable of communicating wirelessly with cellular system (i.e., a wireless carrier) 120 via cellular network 122.

Mobile device 102 further includes a contactless element 106, typically implemented in the form of a semiconductor chip 106(a) (or other data storage element) with an associated wireless data transfer (e.g., data transmission) element 106(b), such as an antenna. Contactless element 106 is associated with (e.g., embedded within) mobile device 102 and data or control instructions transmitted via cellular network 122 may be applied to contactless element 106 by means of contactless element interface 108. Contactless element interface 108 functions to permit the exchange of data and/or control instructions between the mobile device circuitry 104 (and hence the cellular network) and contactless element 106. Mobile device 102 may also include a secure data space 110, which may be used by the device to store operating parameters and/or other data utilized in operation of the device. The secure data space 110 may be in the form of a chip that is separate and apart from the chip in the contactless element 106, or alternatively, could be a section of memory in the chip that forms part of the contactless element 106. Note that the chip in the contactless element 106 may include data storage capability in the form of a memory that may be accessed via interface 108 to permit the implementation of read, write, and erase functions, for example.

Contactless element 106 is capable of transferring and receiving data using a near field communications capability 112 (or near field communications medium) typically in accordance with a standardized protocol or data transfer mechanism (identified as ISO 14443/NFC in the figure). Near field communications capability 112 is a short-range communications capability, such as RFID, Bluetooth™, infra-red, or other data transfer capability that can be used to exchange data between the mobile device 102 and a local transit fare collection apparatus 130 (identified as Transit Fare Collection System (gate, farebox, etc.) in the figure). Thus, mobile device 102 is capable of communicating and transferring data and/or control instructions via both cellular network 122 and near field communications capability 112.

System 100 for enabling a contactless element contained within a mobile device to be used in the fare payment and collection environment further includes Transit Agency central computer/server System 140, which communicates with Cellular Phone System 120 and Transit Fare Collection System 130. Transit Agency System 140 may communicate with Cellular System 120 via the Internet, a telephony system (landline or wireless) or a dedicated communications system. Transit Agency System 140 may communicate with Transit Fare Collection System 130 via one or more of the same types of private or public communications systems. Note that the Transit Agency Central Computer/Server system 140 may be a computer, clearinghouse, or other system supporting a single or multiple cooperating transit agencies in a region.

Transit Agency System 140 may also be capable of communicating with the entity (termed "Issuing Organization/Third Party Proxy" in the figure) 150 that is responsible for performing certain of the transaction data processing functions for system 100. Issuing organization 150 may represent a bank or other financial organization that issues the payment/transit data used in the mobile device (or the device itself), and/or acts as a clearing house for processing certain data associated with the payment and transit transactions (e.g., account reconciliation, billing, etc.). Note that it is also possible for the operator of the cellular network (i.e., Cellular System 120 in the figure) to be in communication with issuing organization 150 (shown as a dotted line in the figure) in order to provide data that may be used by issuing organization 150 in the processing of transit transactions. Further, note that Issuing Organization 150 may be a third party proxy that acts as an intermediary in the transit system data provisioning and/or transaction billing processes.

Figure 2:
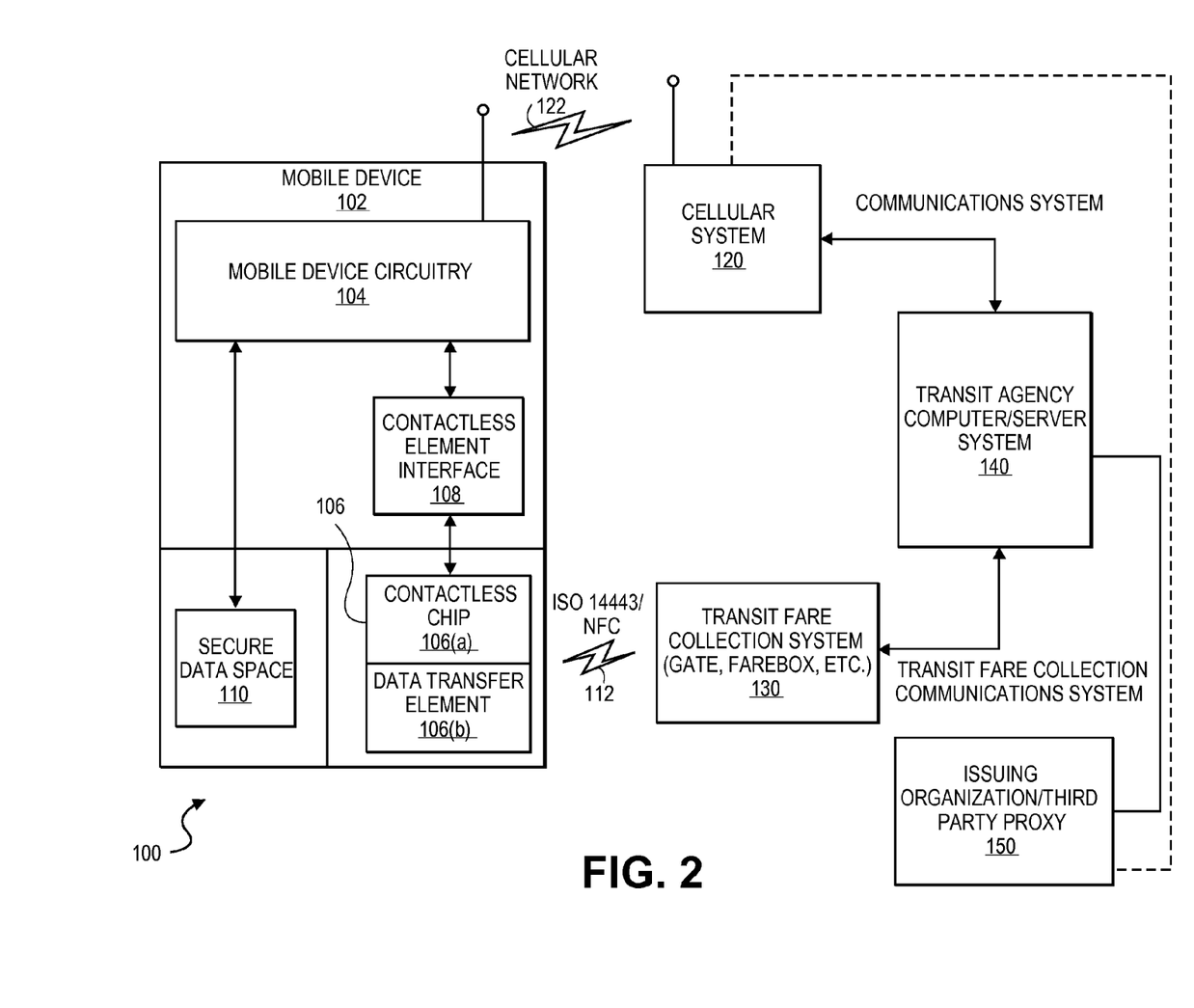
FIG. 2 is a functional block diagram of a second embodiment of a system for enabling a contactless element contained within a mobile device to be used in the fare payment and collection environment, in accordance with an embodiment of the present invention.

FIG. 2 is a functional block diagram of a second embodiment of a system for enabling a contactless element contained within a mobile device to be used in the fare payment and collection environment, in accordance with an embodiment of the present invention. FIG. 2 shows the same elements as FIG. 1, with the exception that the secure data space and/or contactless element contained within the mobile device are depicted as removable elements instead of being integrated within the mobile device, as depicted in FIG. 1. Examples of such removable elements include SIM cards, flash memory cards, and other suitable devices.

As described, inventive system 100 provides an efficient means of using a contactless element in a transit or other environment. By integrating the contactless element with the mobile device's telephony communications capabilities, the cellular network may be used as the data transfer channel between a Transit Agency's computing system and the transit system user's mobile device. This facilitates the provision of access control data, encryption keys, fare calculation data, and other data relevant to a specific transit system. As noted, some of the data and/or processing services may be provided to the end user from another source, such as the issuing organization or a trusted third party, or via the transit agency after being provided by the issuing organization or trusted third party. Such data may include authentication and access control data (encryption keys, passwords, etc.), for example. In this situation a trusted third party may serve as a proxy for the transit agency or issuing organization, and perform certain of the data processing, file maintenance, account billing, or key generation and distribution functions required for operation of the system.

As indicated, the short range communications capability is utilized to transfer data between the mobile device and the transit system's fare collection mechanism (e.g., gate, terminal, farebox, etc.). This communications channel is used to transfer information needed by the transit system to enable a user to have access to a transit device of the system at that site, and provide some or all of the fare calculation data required by the system. As will be described, the inventive system provides both an efficient method of utilizing the contactless element, and in addition, provides other benefits and advantages in the transit fare payment and collection environment.

An example of the typical manner in which a transit system user would utilize the inventive system will now be described. In order to access a transit system using a form of payment other than cash, a user will typically require some form of identification and/or authentication to permit them to be recognized by the system as a valid user who is entitled to utilize the system's resources. This identification or authentication data may be in the form of a password, personal identification number or code (e.g., a primary account number (PAN)), and/or an element of an encryption process (such as a "key" used to calculate an authentication code that must be exchanged with another system element that validates the code). In addition, the transit system will preferably have access to information regarding the user's transit account, i.e., the amount of funds available so as to ensure that the calculated fare can be covered by the account balance.

In order to ensure a desired level of security, different transit systems may have different authentication requirements. In addition, most transit modes (e.g., bus, train, ferry) will have different transit fares and fare computation requirements. As users move between different locations (cities, counties, states, etc.), they may encounter a large number and wide variety of transit system options. In order to utilize a contactless smart element for payment of transit fees, the user preferably has available to him the data required to access and utilize those transit systems.

These and other obstacles may be overcome by the present system in which data required for access to and utilization of a specific transit system may be provided to a user via cellular network 122. A processor (e.g., a microprocessor or computational apparatus) associated with the Transit Agency Computer System 140 may be used to generate and/or control the distribution of access control data, fare computation/collection data, and other data relevant to the operation of a transit system. This data is communicated to an element (e.g., a computer, a transmission tower, a network node, a wireless carrier, etc.) of the cellular system 120 via the Internet or another suitable communications channel. This enables the transit agency to provide a cellular network operator with information to permit a customer of the operator to access and utilize the transit system. Note that in addition to the transit agency, the contactless element issuer and/or transaction data processing agency may also provide data to be stored on the chip in the contactless element, either directly to the cellular operator, via the transit agency, or via a trusted third party organization.

The access control data, fare computation/collection data, and other data relevant to the operation of the transit system is transferred to the mobile device via the cellular network. The data is received by the mobile device and passed through the contactless element interface and stored in the appropriate section of the chip or other form of data storage that forms part of the contactless element. Note that the "data" may also be control instructions that cause the execution of some operation related to the contactless element, such as data storage, data removal, configuration of the data storage element (partitioning of memory), etc.

Transit Agency Computer System 140 may also provide, or generate, certain information regarding the user's account or authentication data to Transit Fare Collection system 130 which may be a fare collection terminal. This data may be used as part of the authentication (access control) process and/or fare computation/collection process. For example, the Transit Agency or transit system operator may provide a list of cards prohibited from use in the transit system (through a negative list), and/or a portion of the data required for a mutual authentication process (such as a part of a "key" or one of two keys required in the authentication process). Further, if a third party is involved in the provisioning of the transit system data or in the account management functions (such as debiting a user account for the transit transaction), this data can be provided to the Transit Agency Computer System 140 or cellular network operator for eventual transmission to the user's mobile device.

As a result, when a user in possession of the mobile device passes within communications distance of a terminal associated with Transit Fare Collection system 130, the contactless element within the device can communicate with the fare collection system via the near field communications capability; in this way, the mobile device can be used to identify the user, exchange authentication data (e.g., encryption keys or other forms of authentication/identification), provide data required for a fare computation, or provide other account related data to the collection system. Further, this data may be provided to the transit agency and/or transaction processing entity if needed for account management or other functions.

As mentioned, one means of performing an authentication process involves the exchange of "keys" to enable mutual authentication between two parties. In this case, the chip embedded in the mobile device would be provisioned with key data that could be used to identify the user (and possibly be linked to the user's account data for transaction processing purposes) and permit access to the transit system. Further, with different keys applicable to different transit systems, and possibly to the same system at different times, the cellular network may be used to provide the required key data as needed by the user.

In addition, note that provision of the required access and/or fare computation data could be triggered by any of several factors: (1) location determining technologies that notify a user of the availability of transit system related data based on geographic proximity to a transit system and initiate the provisioning process automatically or upon user request; (2) detection of user proximity to transit fare collection infrastructure via the near field communications capability; or (3) previously provided trip planning data that is used to trigger the provisioning process based on date/time.

For example, a mobile device equipped with a location determining technology such as GPS (global satellite positioning system) could be used to determine when a user is within a specified distance of a transit terminal, city, region, etc., and this determination could be used by the relevant transit agencies in that region to provide the user with the transit agency data they may require. Providing the data could be done automatically (where data is "pushed" to the mobile device upon determining the location and the relevant transit agencies), or via receiving a request from the user after presenting the user with a message or screen display that permits access to the relevant data. Further, the transit options provided to the user can be filtered based on user preferences, previous user behavior, user characteristics, cost, availability within a certain time frame, or other relevant parameters.

In addition to, or instead of using GPS for location determination, the cellular network infrastructure may be used to determine the location of the mobile device. This method can be used to localize the position of the mobile device to within a cell or section of the network coverage. This may be sufficient to trigger the provision (or offer to provision) transit agency access and fare computation data for the transit modes within the vicinity of the determined location.

Similarly, the transit system data may be provided to the user upon the user being detected by a transit terminal as a result of the contactless element communicating with the terminal using the near field communications capability of the contactless element. In this case, the transit terminal could be configured to detect the contactless element, and provide a message (either directly from the terminal or as a result of a message sent via the cellular network) to the user offering to provision the contactless element with the required transit data.

Further, another method of providing the required transit system data is one based on trip planning data, such as that contained within a calendar program. In this case data concerning the user's expected location is used to trigger the provisioning of the transit system data. For example, on the day a user is expected to be in a particular region or city, the relevant data for the transit systems in that region or city could be provided to the user's mobile device over the cellular network.

As noted, the cellular network may also be used to provide the mobile device with fare computation data such as fare schedules, transit fare account balance, promotional information, and other related transit system information. This data may be stored within the contactless element data storage area and exchanged with the transit fare collection system element (terminal, farebox, etc.) to determine the appropriate fare based on start-point, end-point, time of day, applicable fare structure, etc. The ability to provision the contactless element via the cellular system is particularly advantageous in situations where fare schedules change or rates for use of two separate transit systems are linked (so that a user of one system can obtain a discount on a second system).

As discussed, the inventive system and method may be utilized with a contactless element that is capable of being used for both transaction payment and transit functions. In such a case, the issuer (or another entity) may function as an intermediary or trusted third party for the transit agencies and co-ordinate the provisioning of the contactless element with the transit data. In addition, the contactless element data storage may be configured to broadly contain two regions: a first region dedicated to data for use in a payment transaction (e.g., account data, PIN data, communication protocol data for use in the point of sale environment); and a second region dedicated to the transit application. The second region would preferably be partitioned and managed to be isolated from the first region so that an application accessing one region would be excluded from accessing the other region. This would function to prevent a transit application from accessing private account data such as the PIN, and hence help to ensure the security of such data.

In one embodiment, the transit specific region would be partitioned to accommodate data for multiple transit systems. Allocation of the partitions and associated memory space may be facilitated by a bit-map identifying unused memory space that could be read by a transit system wishing to store data in the data storage element in the mobile device. The bit-map or other form of index could be determined at the time of issuance, or updated to reflect present space allocation (taking into account additions and deletions of data). The transit specific region of the memory may also be a free-form memory, wherein a dynamic file management protocol is utilized. In this approach, a flexible file structure and memory allocation is used to permit multiple transit systems to access and store data as needed. An example of such a dynamic file management system that is suitable for the present invention is one termed the Global Platform Storage Technology, developed by Visa, the assignee of the present invention. A description of such a data storage system is found in U.S. patent application Ser. No. 10/656,858, filed Sep. 5, 2003, entitled "Method and System for Facilitating Data Access and Management On A Secure Token", the contents of which is hereby incorporated by reference in its entirety.

Prior to further discussing the use of a mobile device that is capable of combined payment and transit functions, and the possible scenario of an issuer acting as an intermediary or trusted third party, a brief description of the standard electronic payment operation will be presented. Typically, an electronic payment transaction is authorized if the consumer conducting the transaction is properly authenticated and has sufficient funds or credit to conduct the transaction. Conversely, if there are insufficient funds or credit in the consumer's account, or if the consumer's portable consumer device is on a negative list (e.g., it is indicated as possibly stolen), then an electronic payment transaction may not be authorized. In the following description, an "acquirer" is typically a business entity (e.g., a commercial bank) that has a business relationship with a particular merchant. An "issuer" is typically a business entity (e.g., a bank) which issues a portable consumer device such as a credit or debit card to a consumer. Some entities may perform both issuer and acquirer functions.

In standard operation, an authorization request message is created during or after a consumer purchase of a good or service at a point of sale (POS) using a portable consumer device (such as a credit or debit card). In this case, the portable consumer device may be a wireless phone. The authorization request message can be sent from the POS terminal located at a merchant to the merchant's acquirer, to a payment processing system, and then to an issuer. An "authorization request message" can include a request for authorization to conduct an electronic payment transaction. It may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent data from being compromised.

Figure 3:
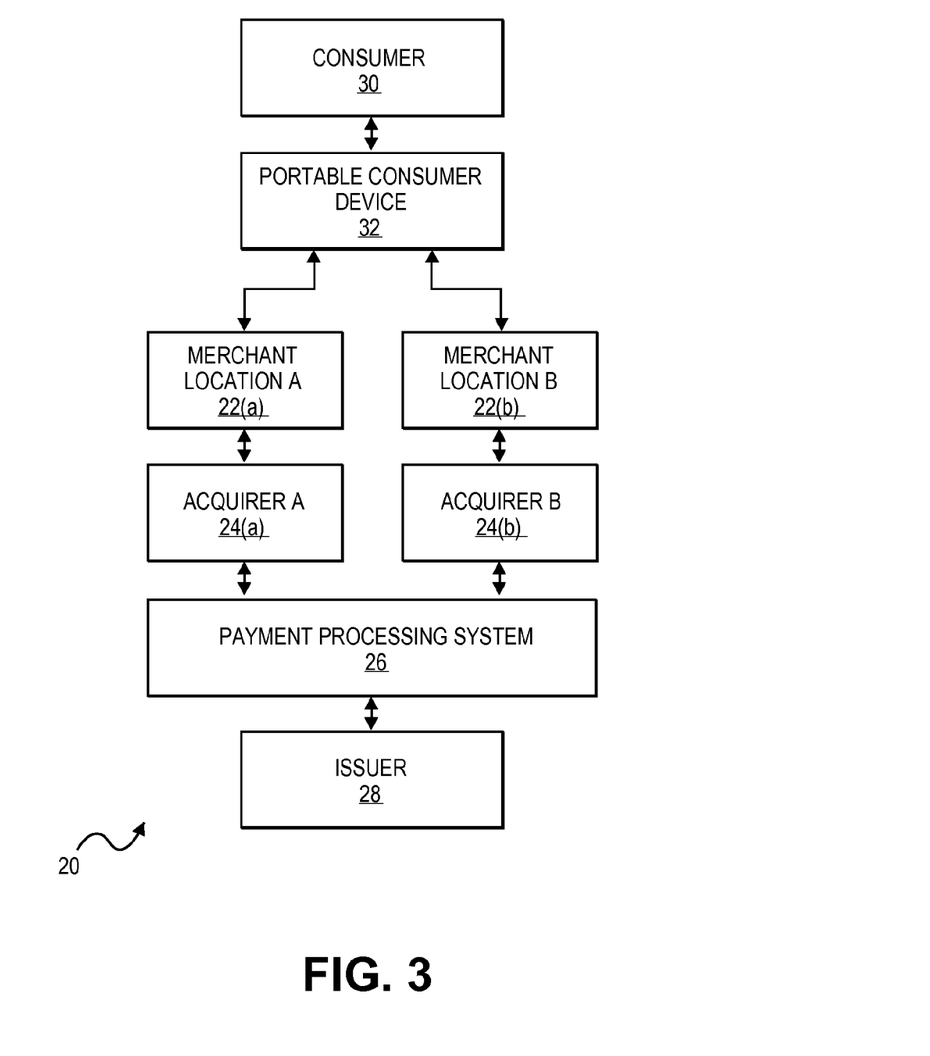
FIG. 3 is a functional block diagram illustrating the primary functional elements of a payment system that utilizes a standard portable consumer device.

FIG. 3 shows a payment system 20 that can be used with a standard payment card as part of a purchase and account management operation. The previously described mobile device can be used with the system 20 as well as the previously described transit system. The system 20 includes merchant locations 22(a), 22(b) and acquirers 24(a), 24(b) associated with those merchant locations. The different merchant locations 22(a), 22(b) may be affiliated with a single merchant. A consumer 30 may purchase goods or services at the merchant locations 22(a), 22(b) using a portable consumer transaction payment device 32. The acquirers 24(a), 24(b) can communicate with an issuer 28 via a payment processing system 26.

The portable consumer device 32 may be in many suitable forms. For example, the portable consumer device can be a mobile device that incorporates a contactless element such as a chip for storing payment data (e.g., a BIN number, account number, etc.) and a wireless data transfer (e.g., transmission) element such as an antenna, a light emitting diode, a laser, etc.). In such a case, the mobile device may incorporate both payment and transit functions. The portable consumer device may also include a keychain device (such as the Speedpass™ commercially available from Exxon-Mobil Corp.), etc. The device containing the chip or other data storage element may be a cellular phone, personal digital assistant (PDAs), pager, transponder, or the like. The portable consumer device may also incorporate the ability to perform debit functions (e.g., a debit card), credit functions (e.g., a credit card), or stored value functions (e.g., a stored value card).

The payment processing system 26 may include data processing subsystems, networks, and other means of implementing operations used to support and deliver authorization services, exception file services, and clearing and settlement services for payment transactions. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing system 26 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processing system 26 may use any suitable wired or wireless network, including the Internet.

The merchant locations 22(*a*), 22(*b*) typically have point of sale (POS) terminals (not shown) that can interact with the portable consumer devices 32. Any suitable point of sale terminal may be used, including device (e.g., card) readers. The device readers may include any suitable contact or contactless mode of operation. For example, exemplary card readers can include RF (radio frequency) antennas, magnetic stripe readers, etc., to interact with the portable consumer devices 32.

As noted, a desirable element of the standard electronic payment transaction system is the entity responsible for the account management functions involved in the transaction. Such an entity may be responsible for ensuring that a user is authorized to conduct the transaction (via an authentication process), confirm the identity of a party to a transaction (via receipt of a personal identification number), confirm a sufficient balance or credit line to permit a purchase, and reconcile the amount of purchase with the user's account (via entering a record of the transaction amount, date, etc.). In the context of the present invention, such an entity may perform certain transit related services in addition to the standard transaction services.

For example, the payment transaction processing entity may be responsible for communicating with one or more transit agency computer systems to provide authentication data (by generating and/or distributing keys) for control of access to transit systems, process data obtained from a transit user's mobile device to associate transit system user identification data with an account used to pay for the transit expenses, generate billing records for transit activities, etc. Further, such an entity may also communicate with the operator of a cellular network to provide such data as needed to the operator for eventual provision to the end user's device. Note that a trusted third party may also perform some or all of these functions, and in that manner act as a clearinghouse for access control data and/or transit activity data processing.

As described, the present invention provides a system, apparatus, and method for enabling the use of a mobile device including a contactless element in a transit fare payment and collection environment. Further, the mobile device may be used for both transaction payment and transit services. Embodiments of the present invention provide a solution to transit environment specific problems, such as transaction time constraints and the need to provision the data storage element in the contactless element with data for multiple transit systems, while facilitating the dual use nature of a typical smart card with dual transit and payment functions. In addition, the use of the cellular network to provision data in the contactless element in the mobile device provides a solution to certain problems that arise in both the payment and transit use cases.

For example, using the cellular network to provision the contactless element eliminates the need for a user to physically visit a transit system location to obtain the data required for access to the system. This benefit is available for the transit specific operations that correspond to both the initial issue of the data for the mobile device and for any re-issuance of the data for the mobile device that is needed because of fraud, etc. Thus, the registration, provisioning and re-provisioning of access control and other data on the chip in the contactless element can be performed without the need for a user to visit a specified location.

Further, as mentioned, data storage space in the chip in the contactless element may be limited, and insufficient to store the data required to provide access to and use of multiple transit systems. One possible solution would be to allocate memory space on the chip in advance to each transit agency that desires to participate. However, as more transit agencies desire to participate, the chip is likely to run out of data storage space. In this situation, the limited memory space on the chip may prevent the chip from being used with transit systems to which the user desires access. Further, in the situation where low cost static memory is used on the chip, once initialized, the chip storage space cannot be modified to add new transit system or agency file partitions.

These and other problems are overcome by an embodiment of the present invention that utilizes a combination of over the air provisioning and a dynamic memory space to provide a user with the data they need to access and utilize the transit systems of choice. The dynamic memory space may be managed to store needed data and remove data that is not presently needed by the user. The over the air provisioning capability provided by the cellular network and/or near field communications channel may be used to erase stale data, re-configure the memory space (e.g., introduce new memory partitions), write identification, access control and/or fare computation data, provide encryption keys, and facilitate other data processing and management operations as required.

As discussed, the inventive system and method may be utilized with a chip that is capable of being used for both transaction payment and transit applications. In such a case, the data storage element may be configured to broadly contain at least two distinct data storage regions: a first region dedicated to data for use in a payment transaction (e.g., account data, PIN data, primary account number or PAN data, expiration date, communication protocol data for use in the point of sale environment, etc.); and a second region dedicated to the transit application (e.g., transit system identification, stored value amounts for specific transit systems, loyalty data, etc.). The second region may be partitioned and managed to be isolated from the first region so that an application accessing one region would be excluded from accessing the other region.

As noted, the transit specific region of the memory may be a free-form memory, wherein a dynamic file management protocol is utilized. In this approach, a flexible file structure and memory allocation is used to permit multiple transit systems to access and store data as needed. Data and memory management instructions provided via the cellular network and/or near field communications channel can be used to control data operations (read, write, erase, etc.), allocate or re-allocate memory areas, and otherwise implement whatever memory management functionality is required. This dynamic memory management capability provides a solution to the problem of limited memory capacity on a chip and to the need to provision the user's device with data for multiple transit systems as required by the user's needs.

Note that the secure data space incorporated in the mobile device may be of many types, depending upon the device type and model. Examples include permanent memory contained with the other circuitry of the device (such as shown in FIG. 1), or removable memory modules intended for data storage (e.g., SIM or SAM chips, as shown in FIG. 2). The secure data space is accessible via components of the device (e.g., the contactless element interface and mobile device circuitry) to provide the ability to add, delete, or modify the contents as required to process transactions in a particular transit fare collection system.

As noted, the secure data space and/or data storage space in the chip in the contactless element is generally limited on a mobile device such as a cell phone. This is one of the motivations for the use of a dynamic data and memory management approach in the present invention. The data and security access keys stored within the memories can be updated based on proximity to or location within a particular city, or proximity to a terminal of a specific transit agency (i.e., detection by a transit terminal followed by provisioning, or location determined to be within some distance of a terminal followed by provisioning). Instead of transit data being permanently written to memory upon issuance, the mobile device's data storage space can be updated and overwritten as required as the device owner moves between locations and applicable transit systems.

Further, as recognized by the inventors, providing a dynamic memory that can be updated in real-time via the cellular network provides a way to implement several beneficial aspects of the system (as noted previously and below):

(1) A transit user will not need to physically go into an attended transit location or to an unattended machine or kiosk in order to store transit system specific data for use in a desired transit system. Data such as encryption keys, transit fare products, and other data specific to a particular transit agency or system may be loaded into the mobile device's secure memory remotely, over the cellular network. This will eliminate the need for a transit user to physically visit a transit location either initially, or upon re-issuance of the credentials. Establishing an account relationship with the transit agency may be accomplished by way of mail, internet, phone or other more convenient processes, with the appropriate transit fare data being loaded to the user's phone over the cellular network;

(2) The file space allocated to each participating transit agency or system can be dynamically managed. As more transit agencies desire to participate, the device memory can be used and overwritten as the user moves from location to location, city to city, and agency to agency. The transit products owned by the user for a specific agency will be held in the device (at least temporarily) and in the agency central computer/server system. When the user travels to a new location, the fare products and data for the relevant transit agencies can overwrite unneeded data for other agencies outside the area. When needed again, the overwritten data can be re-written to the device, as initiated by the agency computer/server system for the new location;

(3) The allocation of secure file space does not have to be done in advance, as with that of card personalization by a bank. As new transit agencies sign up to participate, their file structure, data, and encryption keys can be dynamically loaded to the card/device as needed. This eliminates the need for mobile device or data re-issuance to allow new agencies to participate;

(4) The present invention provides the opportunity for a trusted third party to act as the central computer/server system for multiple transit agencies and systems. This provides the opportunity for multiple agencies and card issuers to work together in a many-to-many relationship for coordination and association of transit fare products and cardholder payment data. This may minimize or eliminate the need for each of the agencies to maintain their own computer/server systems in favor of one party performing transit file management on behalf of many;

(5) Bank issued payment cards typically have an expiration date, and must be re-issued every three to four years. In the case of a card being re-issued, the cardholder would be required to go through a process of registering their new card with each transit agency prior to use of the new card. With the mobile device provisioning solution described herein, this is not necessary. The device will not expire, and the appropriate transit fare products and data can be loaded to the device for use in transit at any time. If the device is lost or exchanged, the new device may be provisioned over the network in a similar manner;

(6) The ability of the mobile device to accept commands from the central/server systems also allows a pro-active key management approach to maintain security. If a key is compromised or if the agency desires key exchange on a regular basis, it is possible that file access keys can be changed through the cellular network;

(7) It is typical for a transit fare account to become invalid from time to time for any of several possible reasons. By using a mobile device in the manner described, it is possible to load data to the device to block its use in a transit application. For example, the payment account that is linked to a transit fare account may be unpaid or become invalid, in which case it may be desirable to block access to transit system usage. Similarly, if the transit account has no value or products, it may be desirable to block operation of the device as a transit fare payment tool, and unblocked it once the payment account is valid again. It is also possible to lock transit use permanently as in the case of a lost or stolen device;

(8) Because a cell phone (as well as other types of mobile devices) has a display, keypad, and scrolling capability, it is possible for transit system users to access their transit accounts. This may provide the ability to remotely monitor transit fare value or product status, review transit rider history, purchase new transit products, obtain passes, etc.;

(9) With the display and keypad functionality of a mobile device (coupled with Internet connectivity), it is possible for a transit system user to gain access to transit system route and scheduling information prior to or during their use of the transit system. The user may be able to determine that a bus is running late, that another route is more efficient, or that service is/is not available for their particular destination. This information may be obtained by one of several mechanisms:

a. Use of the phone's messaging capability (e.g., SMS) to query the agency computer/server systems for route, schedule, and on-time performance of specific buses, trains, etc.; or     b. Use of the phone's NFC capability to query smart signs, on-board terminals, or other in-field information sources that can provide route and service information.

Further, the inventive system also enables potential new business models. For instance, it is possible that special offers covering transit fares and/or other venues could be made available. As an example, a transit system user might see a smart sign for a baseball game. The user would present the device to the smart sign and immediately load a ticket for the game plus a discounted transit pass for the train to and from the game. These products could be loaded to the phone and payment for these products could be charged to the associated payment account.

In addition, there is the potential for location based services to be offered to customers. When a mobile device is used for transit at a bus or rail station, the device can determine its location and offer products and services based on that location. An example is the use of the device to pay for a fare exiting at a rail station and soon after, a coupon for the local coffee shop could be presented on the mobile device.

In accordance with the present invention there have been described a system, apparatus, and methods for enabling use of a mobile device with a contactless element in a transit fare payment environment. The contactless element is embedded within a mobile device that is capable of communication and data transfer over a cellular network. The contactless element may include a chip that may combine transaction payment and transit fare applications. The data on the chip may be provisioned and otherwise manipulated using the cellular network, to provide transit system access and fare calculation data as needed by the user. The chip may utilize a dynamic data storage model to permit the limited storage capacity to be efficiently used for access to multiple and changing transit systems. In addition to transit fare applications, the invention may be used as an access token for other venues, for example, theaters, amusement parks, art exhibits, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
    determining a first location of a mobile device operated by a user;
    based on the first location of the mobile device, determining a first transit system in the vicinity of the mobile device;
    in response to determining the first transit system, automatically pushing first access data comprising a first encryption key and first fare computation data for the first transit system to the mobile device before the user pays to access the first transit system, the first encryption key being stored in a dynamically configurable memory in the mobile device, wherein the first encryption key is configured to generate a first code to obtain access to the first transit system when the mobile device interacts with a first reader at the first transit system and passes the first code to the first reader via a contactless element in the mobile device;
    determining a second location of the mobile device;
    based on the second location of the mobile device, determining a second transit system in the vicinity of the mobile device;
    in response to determining the second transit system, automatically pushing second access data comprising a second encryption key and second fare computation data for the second transit system to the mobile device before the user pays to access the second transit system, the second encryption key being stored in the dynamically configurable memory in the mobile device, wherein the second encryption key is configured to generate a second code to obtain access to the second transit system when the mobile device interacts with a second reader at the second transit system and passes the second code to the second reader via the contactless element in the mobile device; and
    providing a control instruction to the mobile device, the control instruction causing an operation to be performed on the dynamically configurable memory in the mobile device, the operation including altering a file structure or memory allocation of the dynamically configurable memory specific to the second transit system, and deleting the first encryption key stored in the dynamically configurable memory in the mobile device.

2. The method of claim 1, wherein determining the first location of the mobile device further comprises determining the first location using one or more of global positioning satellite (GPS) data or wireless communications network infrastructure data.

3. The method of claim 1, wherein pushing the first access data for the first transit system to the mobile device further comprises pushing the first access data to the mobile device using a wireless communications network.

4. The method of claim 1, wherein the mobile device is a mobile phone.

5. The method of claim 1, wherein when executed by the mobile device, the control instruction causes a partitioning of the dynamically configurable memory.

6. The method of claim 5, wherein the control instruction causes a partitioning of the dynamically configurable memory into a plurality of data storage regions, with each of the plurality of data storage regions associated with a specific transit system.

7. The method of claim 1, wherein the dynamically configurable memory includes a dynamically configurable first data storage region containing transit system data and a second data storage region containing payment transaction account data, the payment transaction account data including a payment account identifier for a payment account, the payment transaction account data used to enable the mobile device to operate as a payment device.

8. The method of claim 7, wherein the payment transaction account data includes user security data for the payment account.

9. The method of claim 1, wherein the dynamically configurable memory is contained in the contactless element.

10. The method of claim 1, wherein the first transit system is one of a train station or a bus station.

11. The method of claim 1, wherein the second location of the mobile device is determined at least in part by a user of the mobile device using the first transit system.

12. The method of claim 1 wherein the first fare computation data comprises a fare schedule for the first transit system.

13. The method of claim 12 wherein the first fare computation data further comprises a transit fare account balance.

14. The method of claim 1 further comprising, receiving preferences of the user regarding data that is pushed to the mobile device.

15. The method of claim 1 wherein determining the first location and determining the second location are performed by a server computer.

16. The method of claim 15, wherein the server computer is in a payment processing system.

17. The method of claim 16 wherein the payment processing system is configured to process authorization requests and clearing and settlement.

18. The method of claim 17 wherein the payment processing system is in communication and an acquirer and an issuer.

19. The method of claim 18 wherein the dynamically configurable memory includes a dynamically configurable first data storage region containing transit system data and a second data storage region containing payment transaction account data, the payment transaction account data including a payment account identifier for a payment account, the payment transaction account data used to enable the mobile device to operate as a payment device, wherein the payment account is held by the issuer.

20. The method of claim 19 wherein the payment account is a debit card account.

21. The method of claim 20 wherein the mobile device is a mobile phone.

22. The method of claim 16 wherein the payment processing system is configured to process credit and debit card transactions.

* * * * *